United States Patent [19]

Paul et al.

[11] Patent Number: 4,947,393
[45] Date of Patent: Aug. 7, 1990

[54] ACTIVITY VERIFICATION SYSTEM FOR MEMORY OR LOGIC

[75] Inventors: Richard F. Paul, Ludington, Mich.; Larry L. Byers, Apple Valley; Wayne A. Michaelson, Circle Pines, both of Minn.

[73] Assignee: Unisys Corporation, Blue Bell, Pa.

[21] Appl. No.: 242,565

[22] Filed: Sep. 12, 1988

[51] Int. Cl.$^5$ .............................................. G06F 11/00
[52] U.S. Cl. .................................. 371/16.1; 371/16.5
[58] Field of Search ..................... 371/16.1, 16.3, 16.5, 371/19, 22.1, 21.1, 22.5, 25.1, 68.3, 67.1, 29.1; 364/200, 900

[56] References Cited

U.S. PATENT DOCUMENTS

| | | | |
|---|---|---|---|
| 3,536,259 | 10/1970 | Okumura | 371/68.3 |
| 3,749,897 | 7/1973 | Hirvela | 371/16.3 |
| 4,213,178 | 7/1980 | Diez et al. | 364/200 |
| 4,538,273 | 8/1985 | Lasser | 371/16.3 |
| 4,586,180 | 4/1986 | Anders | 371/16.3 |
| 4,627,060 | 12/1986 | Huang | 371/16.3 |
| 4,683,568 | 7/1987 | Urban | 371/16.3 |

Primary Examiner—Michael R. Fleming
Attorney, Agent, or Firm—John B. Sowell; Glenn W. Bowen; Robert S. Bramson

[57] ABSTRACT

The logic cards for a main storage unit or computer logic which receive request operations for access to portions of the memory or logic are divided into banks or elements. When a request operation attempts to access one of the elements a return busy signal is raised from that element. The present invention structure generates a predicted busy signal which occurs during the same time the return busy signal should be activated or operable. The return busy signal and predict busy signal are compared in novel circuitry to verify that the element performing the operaton is in fact performing an operation during the predetermined time slot allowed for performance of the requested operation. Fault signals for bank invalidation are stored in internal check trap circuitry for future reference when the requestor raises a subsequent request operation.

16 Claims, 3 Drawing Sheets

| REQUESTED OPERATION | MACHINE CYCLES REQ'D (LOAD COUNT) | DELAY LOAD COUNT - CYCLES |
|---|---|---|
| NORMAL | 5 | N.A. |
| REFRESH | 6 | N.A. |
| BLOCK WRITE | 5 | 7, 10 OR 11 |
| BLOCK READ | 5 | 6 CYCLES |
| PARTIAL WRITE | 12 | N.A. |

ACTIVITY VERIFICATION SYSTEM FOR MEMORY OR LOGIC

BACKGROUND OF THE INVENTION

1. Field of the Invention

The present invention is related to verification circuitry and a system for monitoring either memory or logic output to determine if the memory or logic is responding to an operation request that ordinarily takes a fixed, predetermined amount of time. More particularly, all of the banks of logic and memory are monitored continuously during the operation of any one of the banks to determine if each of the banks is performing the operation which it is instructed to perform.

2. Description of the Prior Art

Modern high speed computing systems employ a large amount of active high speed memory which is usually in the form of a main storage unit comprising very large scale integrated circuits (VLSI) devices. The many memory devices are mounted on cards or boards to form memory cards which are divided into banks or slices or sections. The access time for reading data out of large solid state memories is kept as small as possible to enhance the speed of the computing system. Thus, many large high speed memories do not employ verification and checking circuits which would degrade the access time of the memory or the logic.

Heretofore, several schemes have been employed to verify that the word being accessed from a memory is the word located at the address being accessed. One such verification system checks the address of the memory word with check bits stored with the memory word.

Another system for checking the data and address of a word being accessed in memory is to access the same data in memory twice and compare the data word accessed from memory, however, a system of this type requires approximately twice the access time as a real time verification system.

The more common system for checking data being accessed from a memory is to perform a parity check on the data and/or a parity check on the data and the address being employed to access the memory, however, this system does not verify that the operation being performed on the data is in fact the desired operation intended to be performed.

Heretofore, verification systems and checking circuits for high speed main frame computers were not employed to verify that cards of memory and plural banks of memory on cards were each performing operations or not performing operations designated under control of a requestor during the time designated for performing the operations requested. There is an unmet need for a verification system for verifying the activity of banks of memory or logic in a computing system.

SUMMARY OF THE INVENTION

A principal object of the present invention is to provide a logic checking circuit for verifying that each bank of a memory or logic system of each card in a computer is properly responding to an operational request.

It is another principal object of the present invention to provide a verification system which is operable continuously at each bank of a card of memory or logic.

It is another principal object of the present invention to provide a verification system which verifies that each bank of each card is properly operating during its operational request even during overlap operations.

It is another object of the present invention to provide a verification system which is operable continuously at each bank of a card without degrading access time to the memory or logic involved.

It is another object of the present invention to provide a verification system which is operable to partially check that the correct command or operation request is being performed at the bank of a card or of memory or logic.

It is a general object of the present invention to provide a verification system which checks for errors which occur at two or more banks of a card or memory or logic during an operational request.

According to these and other objects of the present invention there is provided a verification system which includes counter means for generating predetermined counts indicative of an operational request being performed and gating means coupled to the output of the counter means and to a busy return signal generated at each block of memory or logic indicative of an operational request being performed for indicating whether or not the block of memory or logic is performing an operational request at the time and during the time specified for conducting the operational request.

DESCRIPTION OF THE PREFERRED EMBODIMENT

Figures 1, 3:
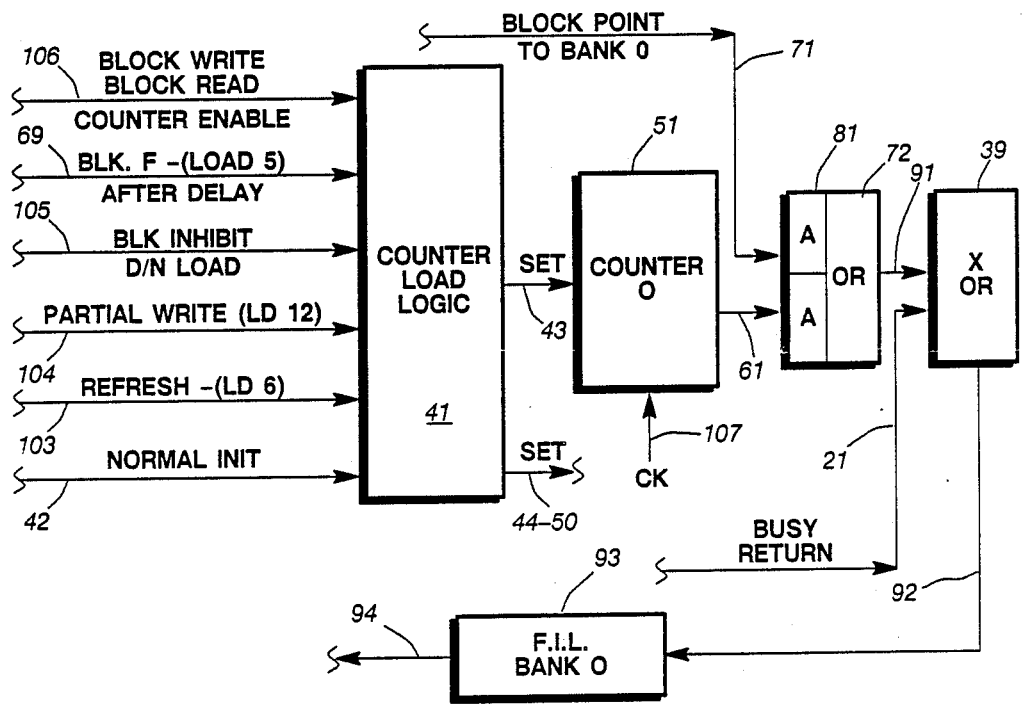
FIG. 1 is a table indicating the exact number of machine cycles required to perform different designated operations.
FIG. 3 is a detailed block diagram of the counter load input logic employed to load one of the counters associated with each block of memory or logic.

Refer now to FIG. 1 showing a table indicating the number of machine cycles which are required to perform requested operations of a main storage unit. The present invention will be explained with reference to a high speed main storage unit but it will be understood that the same logic and verification circuits can be employed with banks of logic circuitry mounted on cards installed in a computer. Stated differently, as long as a predetemined time can be designated for the start and stop of a return busy signal from a piece of equipment or logic in a computing system, the present invention is applicable.

The first column of FIG. 1 is designated requested operation and indicates that normal operations only require five machine cycles whereas a partial write operational request will require 12 machine cycles in the computing system for which the present invention was constructed. Other computers and their associated main storage units may require a different number of machine cycles, however, the start of the phase in which the machine cycle first occurs and the time that the return busy signal is raised is a predetermined time which can be specified and determined in most normal computing systems. When the phase of the machine cycle as well as the number of the machine cycles are used together to specify the start of a requested operation, it is possible to raise the return busy signal at a time which is unique to the requested operation. Column 3 of the table of FIG. 1 indicates that the block write and block read operations require more than the five machine cycles as specified in column 2. The block write operation request will require 7, 10 or 11 machine cycles plus the five cycles specified in column 2 whereas the block read request operation will require a total of 11 machine cycles. The delay load feature simplifies the counters associated with the predict busy signal as will be explained in greater detail with reference to FIG. 2

Figure 2:
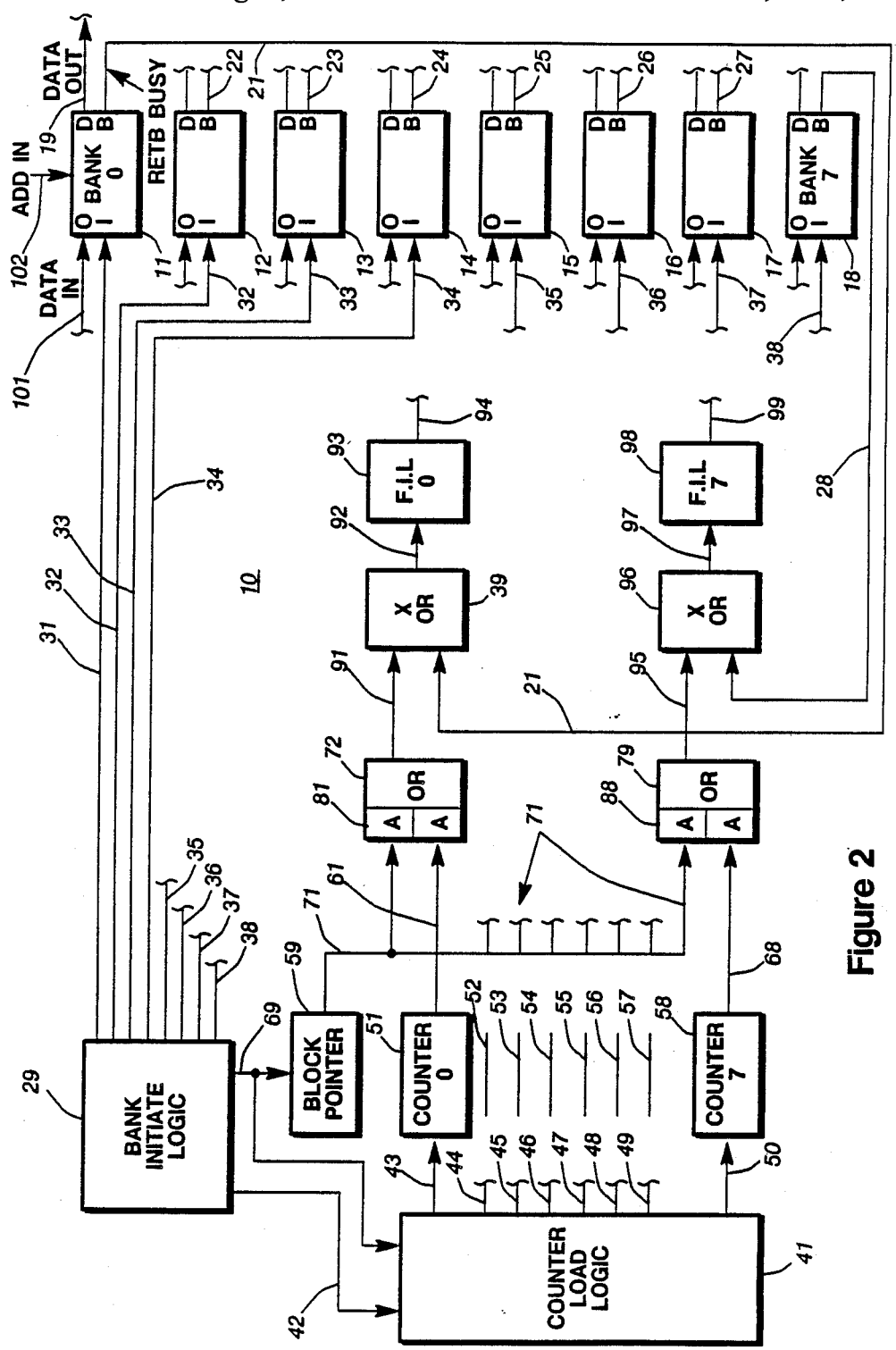
FIG. 2 is a block diagram of the preferred embodiment activity verification system of the present invention.

Refer now to FIG. 2 showing the preferred embodiment activity verification system 10. System 10 is designed to verify the operation being performed in the eight banks of memory 11 through 18. Each of the eight banks of memory contain two (2) megawords of 45 bits each which are accessed in parallel onto the read bus via data out bus 19 from each of the banks 11 through 18. A second output, shown as busy return output lines 21 through 28, are unique to each of the memory banks. The bank initiate logic 29 issues an initiate operate command to one of the banks of memory and cannot initiate another initiate operation command until after a time delay of 30 nanoseconds. As explained with reference to FIG. 2, the time duration for accessing one of the memory banks can take up to 16 machine cycle times. It will be understood that the operation of accessing the different banks of memory will overlap in time. Thus, different return busy signals on lines 21 to 28 will be in effect at the same time. A bank initiate signal line 42 is connected as an input to counter load logic 41 from bank initiate logic 29 and is capable of initiating a normal operation to be explained in greater detail hereinafter. Counter load logic 41 is provided with eight outputs 43 to 50 each of which is connected to one of the eight counters 51 to 58 associated with one of the banks 11 to 18. The output on lines 43 to 50 presets one of the counters 51 to 58 which is decremented to zero so that the counter goes high active during the decrementing phase and then goes inactive low at the count of zero so that a machine cycle active signal time is produced on output lines 61 to 68. The machine cycle time signal on line 61 is preset by counter 51 to a machine cycle time of 5, 6 or 12 machine cycles as explained hereinbefore with reference to FIG. 1. Block write and block read request operations will require in addition to the five machine cycles shown in column 2 (provided by means by counter 51) an additional 6, 7, 10 or 11 machine cycles. These additional delay cycles are provided by block pointer 59, which is activated by the bank initiate logic 29 via line 69. When a block read or block write operation is being initiated the block pointer 59 logically determines the number of additional cycles required for the delayed load count and issues a block busy code signal on lines 71 which is a common line connected to all eight of the predict busy OR gates 72 to 79. The signal on line 71 only passes through one of the AND gates 81 to 88 at a time (timing control lines to the other inputs of the AND gates are not shown) so that only one of the predict busy OR gates 72 to 79 will receive an input signal from block pointer 59 at any one time. Because of the uniqueness of a block write or block read signal, the block pointer signal on line 71 can only be activated to in its associated OR gate 72 to 79 when a return busy signal on lines 21 to 28 from the same associated bank is active and no other return busy signal from the other banks is activated. Stated differently only one return busy signal from the banks 11 to 18 is active when the block pointer signal on line 71 is active. However, during the last five machine cycles of the block read or block write operation which activates one of the counters 51 to 58, the overlap of the return busy signals is again permitted. The output from OR gate 72 on line 91 becomes a predict busy signal whether produced by the block pointer 59 or the preset counter 51. The predict busy signal on line 91 is applied along with the return busy signal on line 21 to exclusive OR gate 39 to produce an output on error signal line 92 only when the two inputs on lines 21 and 91 are not in exact synchronization. The error signal on line 92 is stored in the fault indicating latch 93 and raises the error signal on output line 94 that which will be utilized to raise a fault signal that is employed to invalidate the bank which caused the error signal to be raised.

Each of the banks 11 to 18 has its own associated predict busy OR gate 72 to 79 which produces its own predict busy signal on its associated output line similar to line 91. Thus, the eighth bank numbered bank 7 has its own predict busy OR gate 79 which produces a predict busy signal on line 95 as an input to its associated exclusive OR gate 96 which raises its own error signal on the output line 97 from OR gate 96 to set fault indicating latch 98 and raise the fault signal for invalidating bank 7 on line 99.

During a write operation data written into a bank via its line 101 is stored at a address designated by its address indicator line 102. When reading data out, the data from the bank is read onto its data output line 19 as explained hereinbefore In the preferred embodiment operation of the banks of the main storage unit, the read or write and other operations are performed as normal functions even though errors may have occurred. The error signals are fault signals produced at the output of the fault indicating latches 93 to 98 and will be stored in a manner to be discussed hereinafter.

Refer now to FIG. 3 showing a detailed block diagram of counter load logic 41 inputs and the associated counter and gating circuitry for bank zero. Each of the other seven banks will have identical inputs to the counter load logic 41 but will have a unique set output line 44 to 50 connected to their associated counters 52 to 58. The normal initiate signal on line 42 is associated with normal one word or two word write operation or a two word read or a day clock operation all of which require five machine cycles. Even though the normal initiate signal is raised on line 42 for other requested operations, the signal is ignored or inhibited for refresh requests, block read or write and partial write request operations. Thus, a unique refresh load signal on line 103 is applied to load logic 41 to initiate six machine cycles on one of the unique output set lines 43 to 50. Similarly, a partial write request operation signal on line 104 will raise a 12 machine cycle preset on one of the unique output lines 43 to 50. The block inhibit, NOT load signal on line 105 is employed to inhibit loading one of the machine cycles shown in column 2 of FIG. 1 until after the block pointer 59 is inactivated or drops its high active signal input to its predicted busy OR gate 72 to 79. The block pointer active line 69 from bank initiate logic 29 indicates to the counter load logic 41 that a block function is in progress under control of the block pointer 59. After the block pointer active signal goes low or inactive it provides means for indicating that the delay of 6, 7, 10 or 11 machine cycles has been completed and the counter load logic 41 must set or load five additional machine cycles in one of the counters 51 to 58 associated with the bank in which the block request operation is being performed. A block write and block read counter enable signal line 106 informs the counter load logic 41 which of the counters 51 to 58 is to receive the last five machine cycles being loaded in the counter associated with the bank which is performing the block operation.

Counter load logic 41 is capable of loading any one of the counters 51 to 58 and/or raising the predict busy signal on the output lines from predict busy OR gates 72 to 79. FIG. 3 shows the output gating structure associated with bank zero which includes counter 51 having a clock input 107 employed to decrement the preset counters. The input lines 61 and 71 to the AND gates of OR gate 72 are employed to produce the predict busy signal on predict busy line 91. Exclusive OR gate 39 compares the predict busy signal and the return busy signals on lines 91 and 21 to produce the error signal on line 92 if the two input signals are not in exact synchronization. The error signal on line 92 sets the fault indicating latch 93 which produces and holds the fault signal for bank invalidation on line 94.

Figure 4:
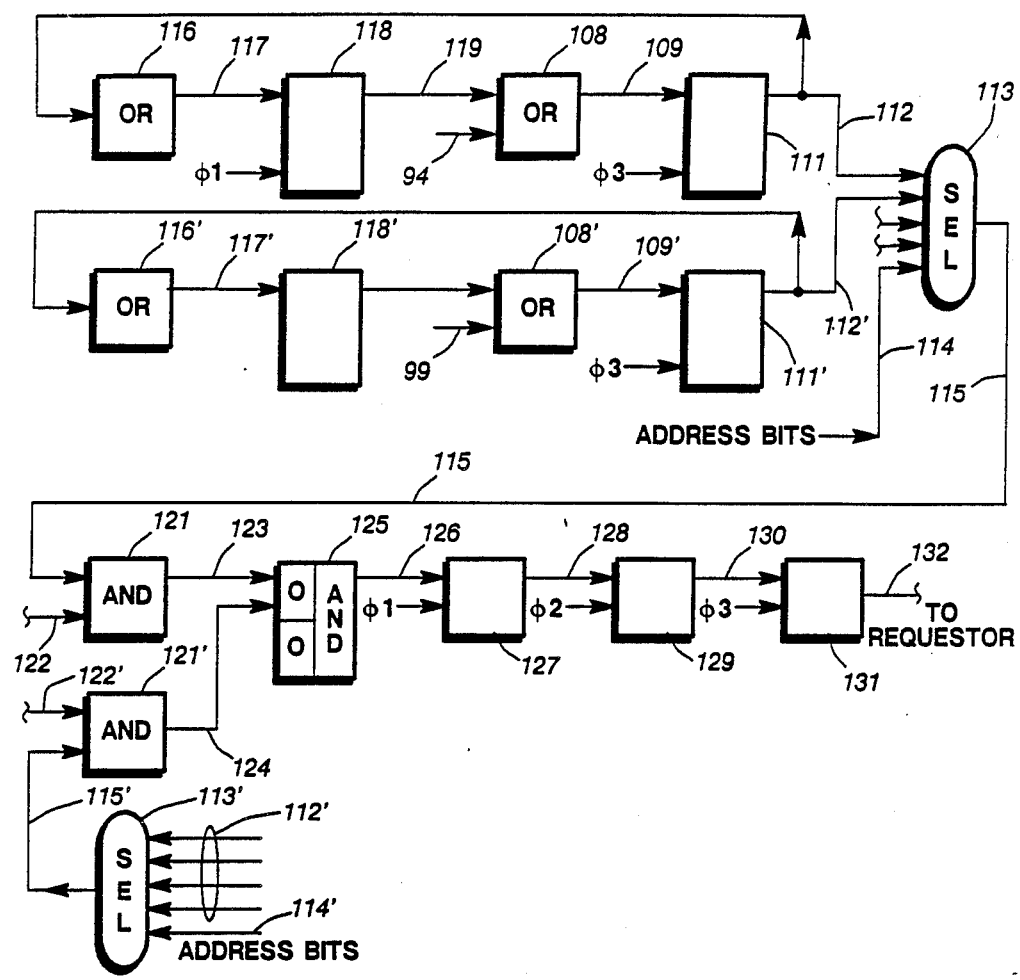
FIG. 4 is a block diagram showing how each of the fault indicating circuits of FIG. 2 reports error information back to the request or logic for indicating and holding block errors.

Refer now to FIG. 4 showing a block diagram of how the fault invalidation signals produced on lines 94 and 99 are employed. The fault signal on line 94 is shown being applied to OR gate 108 to produce an output signal on line 109 employed to set internal check register 111 which latches and holds the input signal from line 109. The output from check register 111 on line 112 is applied to a selector switch or multiplexer 113 having a selector switch address applied at line 114 to select the bank input whose request operation is then active. Thus, the internal check signal on a line 112 from bank zero or one of the other first four banks will appear on line 115 as an output from the selector 113. The internal check signal on line 112 is fed back to the input of OR gate 116 which has other inputs (not shown) to produce a signal on line 117 and to set the internal check master register 118. The signal on line 117 is clocked into register 118 during a phase one clock signal to produce an output signal on line 119 which is applied by OR gate 108. The output on line 109 to register 111 is clocked out during a phase three clock so that the internal check output signal on line 112 is continuously fed back and held as an output signal on line 112. Registers 118 and 111 can only be cleared by a power clear of the unit. Selector 113 is shown having four internal check signal inputs, one from each of the check registers 111 associated with the first four lower ordered banks zero to three.

The gates and lines of a second bank are numbered with the same numbers and primes following the number to indicate that a different internal check signal is being produced for each of the first four banks at their 112' output lines as an input to selector 113. The selector switch address on line 114 will select one of the four inputs for an output on line 115 which is applied to AND gate 121 which has an enable or selection signal on lines 122, 122' that determines whether selector 113 or 113' associated with the first four banks or one of the second four banks will produce the output signal on line 123 or 124 for application to AND gate 125. The output from AND gate 125 on line 126 is a validated internal check signal for the requested operation presently active. The second input to the OR gate side of AND gate 125 on line 124 is produced by AND gate 121' which has a select signal input 122' and the input signal on line 115' from a second selector 113' having four unique outputs from fault indicating latches like latches 111 and 111' to produce the internal check output signals on lines 112' as explained hereinbefore. The address that designates which of the inputs 112' will be produced on output line 115' is applied to the selector 113' at line 114'. The validated internal check signal for the active request on line 126 is unique to one of the eight banks and is set in latch 127 by a phase one clock signal. The output on line 128 to latch 129 is set during a phase two clock cycle. The output from latch 129 on line 130 is set during a phase three clock cycle into latch 131 to produce a phase delayed output signal on line 132 that is returned to the requestor portion of the controller (not shown).

The signal on line 132 indicates to the requestor that the bank presently having a request operation has previously had an error condition because the error condition is latched up in the registers 118 and 111 as previously explained. Thus, it will be understood that a requested operation to one bank can produce an error signal or fault signal for bank invalidation during its request operation and during the same request operation could produce a fault signal for bank invalidation for a separate bank which would be stored in its registers 111' and 118' for future reference. When the second bank whose fault indication signal was stored in registers 111' and 118' is subject to a active request operation, the output signal on line 132 will indicate that this second bank had previously produced a fault signal for bank invalidation. The logic for determining whether the banks which produce the fault signal for bank invalidation will be disabled, or whether their use will be terminated, is a function of the logic in the requestor and the maintenance controller which is not a part of this invention.

Having explained a preferred embodiment activity verification system which continuously monitors the return busy signals from the output of the individual banks of a main storage unit and compares them with unique and individual predict busy signals to produce fault signals for bank invalidation, it will be appreciated that the activity verifications system is continuously operable during normal request operations and access operations to the banks of memory and neither degrades access time to the banks of memory nor does it degrade normal request response activity of a main storage unit.

What we claim is:

1. Logic checking circuits for continuously monitoring memory or logic output, comprising:
    a plurality of cards containing logic or memory elements,
    each of said elements having means for raising a busy return signal during a processor requested logic operation requiring access to said logic or memory elements,
    counter means adapted to be set to a predetermined count for generating predict busy signals which occur during the request operation,
    gating means for comparing said predict busy signals with said return busy signal,
    fault indicating means coupled to the output of said gating means for verifying proper response activity of said logic or memory elements.

2. Logic checking circuits as set forth in claim 1 which further includes counter load logic means coupled to said counter means for presetting said counters to produce said predict busy signals.

3. Logic checking circuits as set forth in claim 2 wherein said counter load logic means is provided with a plurality of outputs,
and wherein said counter means comprises a plurality of counters, one coupled to each output from said counter load logic means.

4. Logic checking circuits as set forth in claim 3 wherein there is provided one counter for each memory element being monitored.

5. Logic checking circuits as set forth in claim 4 wherein said counter load logic means is enabled to load two or more counters during a request operation.

6. Logic checking circuits as set forth in claim 2 wherein said counter load logic means includes a plurality of inputs adapted to identify the type of request operation being activated to generate said return busy signal.

7. Logic checking circuits as set forth in claim 6 wherein said counter load logic means further includes logic for determining the number of machine cycles required to perform said requested operation to be performed at said elements which raises a return busy signal.

8. Logic checking circuits as set forth in claim 7 wherein said counter load logic means further includes means for setting one of said counters to a predetermined count which coincides with the time occupied by said return busy signal.

9. Logic checking circuits as set forth in claim 1 which further includes a block pointer for generating a signal which delays the initiation of the output of said counter means to said gating means.

10. Logic checking circuits as set forth in claim 9 wherein the output signal from said block pointer is applied to the gating means for each of said memory elements simultaneously to prevent more than one predict busy signal from being activated during a block operation.

11. Logic checking circuits as set forth in claim 10 wherein said block pointer signal applied to said gating means is adapted to become inactive during the last five machine cycles of a block operation and wherein said counter load logic means is activated to preset one of said unique counters to permit generation of a predict busy signal at the output of said gating means associated with said unique counter.

12. Logic checking circuits as set forth in claim 11 wherein said counter load logic means is enabled to set two or more of said counters of said counter means during a request operation occurring during the last five machine cycles.

13. Logic checking circuits as set forth in claim 1 wherein said fault indicating means comprises a fault indicating latch for each element being monitored, and
said fault indicating latches, each providing a fault signal for bank invalidation coupled to an internal check trap circuit which latches and holds the fault signals for bank invalidation for each of the logic or memory elements subject to a request operation.

14. Logic checking circuits as set forth in claim 13 wherein said internal check trap circuitry latches and holds fault signals and generates an output signal reported to a requestor logic.

15. Logic checking circuits as set forth in claim 14 wherein said internal check trap circuitry may trap and store fault signals for more than one element during a single request operation.

16. Logic checking circuits as set forth in claim 15 where said internal check trap circuitry generates an error or fault signal returned to said requestor on subsequent request operations to a bank element whose internal check trap circuitry has stored a previous error.

* * * * *